United States Patent [19]
Whittemore

[11] Patent Number: 5,214,010
[45] Date of Patent: May 25, 1993

[54] ALUMINA-CARBON COMPOSITIONS AND SLIDEGATE PLATES MADE THEREFROM

[75] Inventor: Dwight S. Whittemore, Bethel Park, Pa.

[73] Assignee: Indresco, Inc., Dallas, Tex.

[21] Appl. No.: 897,607

[22] Filed: Jun. 10, 1992

Related U.S. Application Data

[63] Continuation of Ser. No. 587,018, Sep. 24, 1990, abandoned.

[51] Int. Cl.$^5$ .............................................. C04B 35/44
[52] U.S. Cl. .................................. 501/105; 501/100; 501/89
[58] Field of Search ......................... 501/100, 105, 89

[56] References Cited

U.S. PATENT DOCUMENTS

| | | | |
|---|---|---|---|
| 2,768,088 | 10/1956 | Doat et al. | 501/100 |
| 3,753,744 | 8/1973 | Komaru et al. | 501/89 |
| 4,108,675 | 8/1978 | Tomita et al. | 501/100 |
| 4,261,878 | 4/1981 | Hirose et al. | 260/38 |
| 4,306,030 | 12/1981 | Watanabe et al. | 501/99 |
| 4,326,040 | 3/1982 | Kaji et al. | 501/100 |
| 4,471,059 | 9/1984 | Yoshino et al. | 501/96 |
| 4,506,022 | 3/1985 | Whittemore et al. | 501/100 |
| 4,646,950 | 3/1987 | Gotoh et al. | 222/591 |
| 4,775,504 | 10/1988 | Shikano et al. | 501/100 X |
| 4,830,992 | 5/1989 | Ichikawa et al. | 501/100 |

OTHER PUBLICATIONS

Webster's II, New Riverside Dictionary pp. 314, 390, 441.

*Primary Examiner*—Mark L. Bell
*Assistant Examiner*—Deborah Jones

[57] ABSTRACT

A refractory composition consisting essentially of, for each 100 wt. % thereof, about 40 to 80 wt. % of an alumina, about 5 to 30 wt. % of a zirconia-containing grain, about 2 to 10 wt. % of a carbon, and about 1 to 12 wt. % of an oxidation and erosion resistance additive, the method of making refractory shapes utilizing such composition, and the resultant shapes.

9 Claims, No Drawings

ALUMINA-CARBON COMPOSITIONS AND SLIDEGATE PLATES MADE THEREFROM

This application is a continuation of application Ser. No. 587,018 filed Sep. 24, 1990, now abandoned.

BACKGROUND OF THE INVENTION

Refractory slide gates are used in metallurgical vessels in order to control removal of molten metal therefrom. They are subject to extremely high temperatures and the corrosive action of the molten metals passing through the openings in slide gate plates and, consequently, efforts have been constantly undertaken in order to improve the erosion and/or corrosion resistance of slide gates.

At the present time, alumina-carbon slide gate plates have been shown to have improved properties compared to burned high alumina slide gates with a mullite bond. However, there are even with such compositions unsatisfactory drawbacks. Primarily, there is the lack of resistance to oxidation of the carbon and high costs due to the necessity to burn the shape under reducing conditions to produce SiC bonds which result from the reaction of silicon with carbon in the matrix of the shape.

Efforts to overcome these problems of lack of oxidation resistance and high processing costs have not been satisfactory.

SUMMARY OF THE INVENTION

The present invention overcomes the problems of the prior art by providing refractory compositions and resulting shapes, such as slide gate plates, which have superior erosion and corrosion resistance properties compared to presently utilized compositions and shapes and which do not require any burning to form the shape.

Briefly stated, this invention comprises a refractory composition comprising for each 100 wt. % thereof about 40 to 80 wt. % of an alumina, about 5 to 30 wt. % of a zirconia containing grain: about 2 to 10% by weights of a carbon, and about 1 to 12 wt. % of an oxidation and erosion resistance additive.

The invention also comprises the resultant shapes and the method of making such shapes as hereinafter set forth.

DETAILED DESCRIPTION

While the invention is utilized with a wide variety of refractory shapes subject to the erosive and corrosive actions of molten metals, it will be described in connection with slide gate plates. As is known there are a large number of different types of slide gates utilizing varying numbers of stationary and movable refractory plates. Also a wide variety of different shaped plates are used and the instant invention is applicable to all the different shaped and sized refractory slide gate plates.

The broad manufacturing steps for production of slide gate plates are well known and are utilized in the subject invention. Namely, the suitable refractory mix is formed, pressed into the shape desired, and then machined to the particular specification dimensions that are required. Such procedural steps and equipment used in the processing are conventional in this art.

What is unique with the process of the instant invention is that the refractory shapes, and slide gate plates in particular, can be made without utilizing the reducing conditions and high temperatures and apparatus that are required to burn alumina-carbon slide gate plates under such reducing conditions.

Thus, with the instant invention a refractory composition can simply be formed, then placed as by pressing, into the shape desired, machined if necessary, and the shape then cured at a temperature below the burning temperature of the refractory composition.

If desired, as hereinafter set forth, the cured refractory shape can be impregnated with a hydrocarbon such as tar, pitch, or the like and the resultant shape then preferably baked at a temperature of about 400° to 1000° F.; again below the burning or firing temperature of the composition, in order to reduce the volatiles and in some instances eliminate the volatiles from the hydrocarbon used.

The result is a refractory slide gate plate having improved erosion and corrosion resistance properties compared to conventional alumina-carbon slide gates and thus a longer effective life. Also, the instant method of manufacture is such, that by eliminating the need for a firing under reducing conditions, significant cost advantages are achieved.

As to the composition, it consists essentially of alumina, a zirconia containing grain, a carbon, and an oxidation and erosion resistance additive.

As plus additions to this composition, a phenolic resin bonding agent and a curing agent therefor are utilized. If desired, it is also possible to utilize other conventional components in minor amounts for the usual effect.

As to the alumina, it can be any alumina conventionally used in making refractory shapes; preferably alumina containing at least about 96% aluminum oxide, and in this regard either sintered or calcined alumina can be utilized. It is preferred to use $-6$ mesh (Tyler) grain through fines.

With regards to the zirconia containing grain, it can be either a naturally occurring ore such as baddeleyite or a manufactured grain such as a fused alumina-zirconia or a mullite-zirconia. Such grain should contain about 5 to 30% by weight zirconia and as utilized it should again be anywhere from $-6$ to $+48$ mesh (Tyler).

As to the carbon, it can be any of the carbon containing materials conventionally used in refractories such as a graphite, petroleum coke, carbon black, and the like, or mixtures thereof. A combination of flake graphite and carbon black is preferred. It is preferred to use $-48$ mesh (Tyler) carbonaceous material.

As to the oxidation and erosion resistance additive it can be silicon, aluminum, silicon carbide, ferrosilicon nitride (FeSiN), or mixtures thereof. It is preferred to use a combination of silicon carbide, silicon, and aluminum metal or the same three components together with the FeSiN. The oxidation resistance additive is added in an amount of about 1 to 12% by weight of the mixture.

The additive itself, while it can be composed of equal percent by weight of each of the preferred three components, or four preferred components, it is preferred to utilize, for each 100 wt. % of the total refractory composition for the three component additive from about 2 to 10 wt. % of silicon carbide, 1 to 4 wt. % of silicon, and 1 to 4 wt. % of aluminum. The silicon carbide, silicon, and aluminum powder should be $-100$ mesh; all Tyler mesh sizes.

As to the four component additive there can be used, for each 100 wt. % of the total refractory composition, 2 to 8 wt. % silicon carbide, 1 to 4 wt. % silicon, 1 to 4 wt. % aluminum, and 1 to 3 wt. % FeSiN.

With respect to the phenolic resin used, it is used in an amount required to bond, usually from about 3 to 5 wt. % based on 100% wt. % of the refractory composition. Any of the phenolic resins conventionally used for resin bonding of refractories can be utilized. It is thus possible to use liquid resole or powdered novolak resins; although it is preferred to utilize combinations thereof.

As to proportions of the main components of the composition, it is preferred to use from about 5 to 30 wt. % of the zirconia containing grain, 40 to 80 wt. % alumina, 5 to 10 wt. % of the carbon, and 1 to 12% by weight of the oxidation and erosion resistance additive.

The invention will be further described in connection with the following examples which are set forth for purposes of illustration only.

EXAMPLES 1 to 8 burned under reducing conditions instead of being cured), impregnated with tar, and baked according to the method of this invention, unsatisfactory results were obtained; a weight loss of 3.2% by wt.

The most favorable results were obtained in Example 7 which resulted in a loss of only 1.2% by weight as a direct result of the oxidation simulated in this test. Example 7 illustrates the advantages of the compositions and methods of this invention over burned refractory compositions employed in prior art, and the fact the combination of silicon, aluminum, silicon carbide, and ferrosilicon nitride significantly reduces the effects of oxidation on this refractory composition under normal working conditions.

In Table I and the Table II that follow, the mesh sizes are Tyler and proportions of each component are in wt. %.

TABLE I

| Examples No. | 1 | 2 | 3 | 4 | 5 | 6 | 7 | 8 |
|---|---|---|---|---|---|---|---|---|
| Mix: | | | | | | | | |
| Alumina-zirconia (75%-25%) | 30 | 30 | 30 | 30 | 30 | 30 | 30 | — |
| Fused alumina zirconia & silica grain | — | — | — | — | — | — | — | 30 |
| Tabular Alumina, −10 m | 36 | 34 | 34 | 32 | 34 | 32 | 30 | 32 |
| Tabular Alumina, −325 m | 12 | 9 | 11 | 8 | 12 | 11 | 8 | 8 |
| Alumina | 10 | 10 | 10 | 10 | 10 | 10 | 10 | 10 |
| SiC −200 m | — | 5 | — | 5 | — | — | 5 | 5 |
| Flake Graphite | 6 | 6 | 6 | 6 | 6 | 6 | 6 | 6 |
| Carbon Black | 2 | 2 | 2 | 2 | 2 | 2 | 2 | 2 |
| Silicon | 4 | 4 | 4 | 4 | 3 | 3 | 3 | 4 |
| Aluminum | — | — | — | — | 3 | 3 | 3 | — |
| Ferrosilicon Nitride, BMF | — | — | 3 | 3 | — | 3 | 3 | 3 |
| Plus Additions: | | | | | | | | |
| Powdered Novolak Resin | 1.8 | 1.8 | 1.8 | 1.8 | 1.8 | 1.8 | 1.8 | 1.8 |
| Liquid Resole Resin | 3.3 | 3.3 | 3.3 | 3.35 | 3.3 | 3.5 | 3.4 | 3.4 |
| Pressed Density, pcf (Av 2): | 197 | 193 | 195 | 192 | 194 | 195 | 193 | 186 |
| Treatment: | Cured at 400° F., Tar Impregnated and Baked at 850° F. | | | | | | | |
| Bulk Density, pcf (Av 2): | 195 | 193 | 195 | 192 | 194 | 193 | 191 | 185 |
| % App. Porosity (Av 2): | 5.1 | 5.1 | 4.8 | 4.5 | 3.6 | 4.5 | 4.9 | 5.7 |
| App. Sp. Gravity (Av 2): | 3.29 | 3.26 | 3.28 | 3.21 | 3.22 | 3.24 | 3.22 | 3.14 |
| Modulus of Rupture, psi (Av 2): | 3000 | 3310 | 3310 | 3740 | 3610 | 3170 | 2940 | 3180 |
| Hot Crushing at 2800° F., psi (Av 2): | 5730 | 5810 | 5780 | 6020 | 7240+ | 7130+ | 6860+ | 4330 |
| Oxidation Test % Wt. Loss (Av 1): | 2.1 | 1.9 | 2.4 | 2.2 | 2.2 | 1.5 | 1.2 | 2.2 |

A series of eight refractory mixes were prepared and the mix formulations are set forth in Table I. Each mixture was admixed, pressed at 15,000 psi into brick, cured at 400° F., tar impregnated and baked at 850° F.

The brick were then tested as to strength and erosion properties and the results are also set forth in Table 1.

The oxidation test results were obtained by determining carbon dioxide produced in an atmosphere of 98% argon, 2% oxygen while each sample (a ⅝ inch, 2 inch long cylinder) was heated to 2500° F. in three hours and held three hours at that temperature. The sample cylinder was horizontally mounted in a furnace tube and the argon/oxygen gas mixture was injected into the tube at a rate of about 0.25 l/min. The exhaust gas was monitored using an infrared analyzer which indicated the volume percent of CO/CO2 gas which is a measure of the oxidation rate of carbon in the sample.

When an alumina-carbon refractory similar in composition to Example 1 was used (this composition being

EXAMPLES 9 to 16

A series of eight refractory mixes were prepared and the mix formulations are set forth in Table II. Brick were formed and tested as in Examples 1–8. In addition a special test was devised to determine the strength of the brick after the brick is exposed to oxidation in air at 2100° F. for four hours. The brick were cut to a size suitable for running an abrasion test similar to the ASTM test method C-704 which shoots SiC grit on to the face of the brick. The volume of material eroded from the sample was then determined. Table II shows the results of the several mixes tested in this manner. It is evident from the results that the addition of powdered metals Si and Al, as well as silicon carbide and SiC, are all beneficial to reducing erosion in the test. The addition of alumina-zirconia grain also improved erosion resistance.

TABLE II

| Examples No. | 9 | 10 | 11 | 12 | 13 | 14 | 15 | 16 |
|---|---|---|---|---|---|---|---|---|
| Mix: | | | | | | | | |
| Alumina-Zirconia, 6/28 m | 20 | 20 | 20 | 20 | 20 | 20 | 20 | — |
| Tabular Alumina, −6 m | 41 | 41 | 42 | 43 | 43 | 41 | 42 | 61 |
| Tabular Alumina, −325 m | 10 | 10 | 11 | 15 | 14 | 10 | 11 | 10 |
| Alumina −325 m | 10 | 10 | 10 | 10 | 10 | 10 | 10 | 10 |
| Silicon Carbide −200 m | 5 | 5 | 5 | — | 5 | 5 | 5 | 5 |
| Flake Graphite | 8 | 8 | 8 | 8 | 8 | 8 | 8 | 8 |
| Silicon, −200 m | 3 | 4 | 4 | 4 | — | — | — | 3 |
| Silicon, 2.6 FAD | — | — | — | — | — | 3 | 4 | — |
| Aluminum, −200 m | 3 | 2 | — | — | — | 3 | — | 3 |
| Plus Additions: | | | | | | | | |
| Novolak Resin of EX. 1-8 | 1.5 | 1.5 | 1.5 | 1.5 | 1.5 | 1.5 | 1.5 | 1.5 |
| Resole Resin of EX. 1-8 | 2.9 | 2.9 | 2.9 | 3.0 | 3.0 | 3.0 | 3.1 | 3.1 |
| Density at Press, pcf | 191 | 191 | 191 | 193 | 198 | 191 | 191 | 187 |
| Cured | | | | | 400° F. | | | |
| Test After 2100° F. Oxidation-Abrasion Test | | | | | | | | |
| Volume Loss, cc's | 10 | 13 | 38* | 40* | Too Weak To Test | 6 | 24 | 14 |

*Sample Abraded Through

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A refractory composition consisting essentially of, for each 100 wt. % thereof, about 40 to 80 wt. % of an alumina, about 5 to 30 wt. % of a zirconia containing grain, about 2 to 10 wt. % of a carbon, and about 1 to 12 wt. % of an oxidation and erosion resistance additive that is a mixture of silicon, aluminum and at least one of silicon carbide, ferrosilicon nitride, and a combination thereof.

2. The refractory composition of claim 1, wherein the alumina is tabular alumina, the zirconia containing grain is selected from fused alumina-zirconia, mullite-zirconia, and baddeleyite.

3. The refractory composition of claim 1 or 2, wherein said oxidation and erosion resistance additive consists of, for each 100 wt. % of the refractory composition, about 1 to 4 wt. % silicon, about 1 to 4 wt. % aluminum, and about 2 to 10 wt. % silicon carbide.

4. The refractory composition of claim 1 or 2, wherein said oxidation and erosion resistance additive consists of, for each 100 wt. % of the refractory composition, about 1 to 4 wt. % silicon about 1 to 4 wt. % aluminum, about 2 to 8 wt. % silicon carbide, and 1 to 2 wt. % ferrosilicon nitride.

5. A refractory shape formed by shaping and curing, without utilizing reducing conditions, a composition at a temperature below the burning temperature of said composition, said composition consisting essentially of, for each 100 wt. % thereof, about 40 to 80 wt. % alumina, about 5 to 30 wt. % of zirconia containing grain, about 2 to 10 wt. % of a carbon, and about 1 to 12 wt. % of an oxidation and erosion resistance additive that is a mixture of silicon, aluminum and at least one of silicon carbide, ferrosilicon nitride, and a combination thereof.

6. The refractory shape of claim 5, wherein the alumina is tabular alumina, the zirconia containing grain is selected from fused alumina-zirconia, mullite-zirconia, and baddeleyite.

7. The refractory shape of claim 6, wherein said oxidation and erosion resistance additive consists of for each 100 wt. % of the refractory composition, about 1 to 4 wt. % silicon, about 1 to 4 wt. % aluminum, and about 2 to 10 wt. % silicon carbide.

8. The refractory shape of claim 6, wherein said oxidation and erosion resistance additive consists of, for each 100 wt. % of the refractory composition, about 1 to 4 wt. % silicon, about 1 to 4 wt. % aluminum, about 2 to 8 wt. % silicon carbide, and 1 to 2 wt. % ferrosilicon nitride.

9. The refractory shape of any one of claims 5 to 8 wherein said shape is a slide gate plate.

* * * * *